United States Patent [19]

Morlion et al.

[11] Patent Number: 5,390,268
[45] Date of Patent: Feb. 14, 1995

[54] CONNECTOR ASSEMBLY

[75] Inventors: Danny Morlion, St. Amandsberg; Luc Jonckheere, Dilbeek, both of Belgium

[73] Assignee: Framatome Connectrors International, Paris, France

[21] Appl. No.: 163,667

[22] Filed: Dec. 7, 1993

[30] Foreign Application Priority Data

Dec. 16, 1992 [NL] Netherlands ................. 9202173

[51] Int. Cl.⁶ .................... G02B 6/00; G02B 6/36
[52] U.S. Cl. .................... 385/59; 439/197; 385/88
[58] Field of Search ............ 439/188, 197, 259, 260, 439/263, 284, 289; 385/59, 76, 88, 89, 73, 92

[56] References Cited

U.S. PATENT DOCUMENTS

| | | | |
|---|---|---|---|
| 3,792,284 | 2/1974 | Kaelin | 385/92 |
| 4,033,668 | 7/1977 | Presby | 385/95 |
| 4,116,532 | 9/1978 | Hubbard et al. | 350/96.21 |
| 4,323,300 | 4/1982 | Stewart et al. | 350/96.21 |
| 4,461,539 | 7/1984 | Bailey et al. | 385/73 |
| 4,968,265 | 11/1990 | Fox, Jr. | 439/197 |
| 5,091,988 | 2/1992 | Degani et al. | 385/70 |
| 5,159,654 | 10/1992 | Salter | 385/59 |
| 5,337,388 | 7/1994 | Jacobowitz et al. | 385/76 |

*Primary Examiner*—Akm E. Ullah
*Attorney, Agent, or Firm*—Perman & Green

[57] ABSTRACT

A connector assembly for interconnecting optical and/or electrical conductors comprises a first connector part with a first guiding plate with one or more guiding channels for first conductors each terminated by a contact pad and a second connector part to be coupled with the first connector part and having a second guiding plate with one or more guiding channels provided in a corresponding manner for second conductors to be connected with the first conductors and each terminated by a contact pad. The guiding plates comprise positioning means for mutually positioning the guiding plates in the coupled position of the connector parts in such a manner that corresponding contact pads of the first and second conductors are interconnected optically and electrically, respectively. These positioning means comprise cooperating straight reference surfaces extending in x-direction and cooperating straight reference surfaces extending in y-direction, all said reference surfaces being located at a predetermined location with respect to the guiding channels, wherein the second guiding plate is mounted moveably in x-, y- and z-directions in a housing and wherein means are provided for exerting forces for pressing the cooperating reference surfaces and the contact pads towards each other in the x-, y- and z-directions during coupling the connector parts. One connector part can be inserted into the other in the longitudinal direction of the guiding channels, wherein distance elements are adapted to keep the contact pads of the conductors at a distance from each other in z-direction during inserting of the connector part and to enable the movement of the contact pads towards each other in z-direction as soon as the cooperating reference surfaces are substantially abutting.

12 Claims, 4 Drawing Sheets

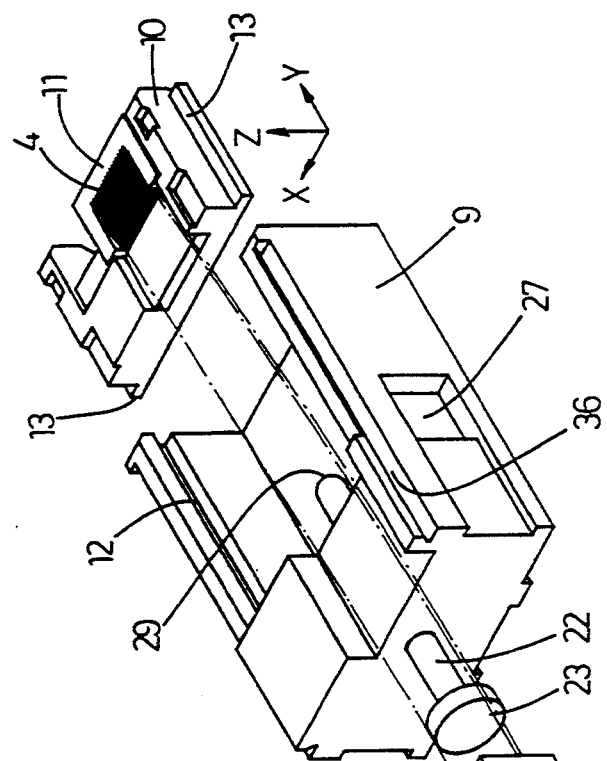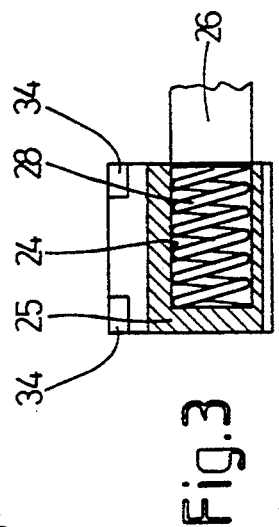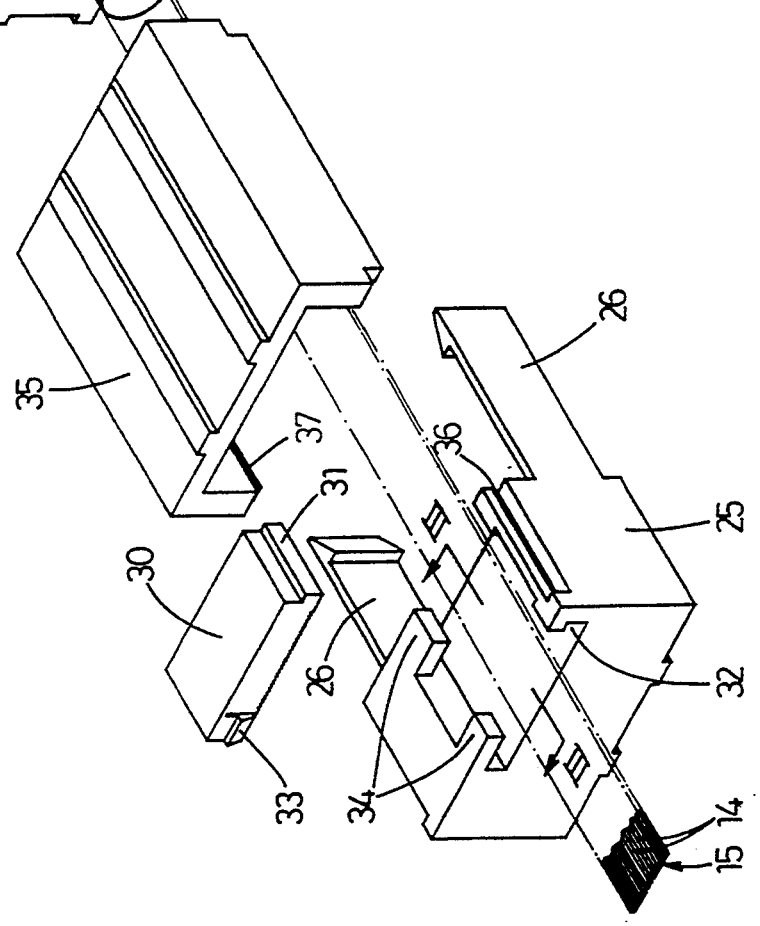
Fig. 2
Fig. 3

CONNECTOR ASSEMBLY

BACKGROUND OF THE INVENTION

The invention relates to a connector assembly for interconnecting optical and/or electrical conductors, comprising a first connector part with a first guiding plate with one or more guiding channels for first conductors each terminated by a contact pad and a second connector part to be coupled with the first connector part and having a second guiding plate with one or more guiding channels provided in a corresponding manner for second conductors to be connected with the first conductors and each terminated by a contact pad, wherein the guiding plates comprise positioning means for mutually positioning the guiding plates in the coupled position of the connector parts in such a manner that corresponding contact pads of the first and second conductors are interconnected optically and electrically, respectively, said positioning means comprising cooperating straight reference surfaces extending in x-direction and cooperating straight reference surfaces extending in y-direction, all said reference surfaces being located at a predetermined location with respect to the guiding channels, wherein the second guiding plate is mounted moveably in x-, y- and z-directions in a housing and wherein means are provided for exerting forces for pressing the cooperating reference surfaces and the contact pads towards each other in the x-, y- and z-directions during coupling the connector parts, wherein one connector part can be inserted into the other in the longitudinal direction of the guiding channels, as described in the pending application Ser. No. 08/063,447 now pending assigned to the same assignee.

SUMMARY OF THE INVENTION

The invention aims to provide a connector assembly of this type which on the one hand is particularly suitable for connecting a flat cable with a printed circuit board or the like and on the other hand in an adapted embodiment is also suitable for connecting printed circuit boards with a backpanel.

According to the invention a connector assembly is provided for interconnecting optical and/or electrical conductors, comprising a first connector part with a first guiding plate with one or more guiding channels for first conductors each terminated by a contact pad and a second connector part to be coupled with the first connector part and having a second guiding plate with one or more guiding channels provided in a corresponding manner for second conductors to be connected with the first conductors and each terminated by a contact pad, wherein the guiding plates comprise positioning means for mutually positioning the guiding plates in the coupled position of the connector parts in such a manner that corresponding contact pads of the first and second conductors are interconnected optically and electrically, respectively, said positioning means comprising cooperating straight reference surfaces extending in x-direction and cooperating straight reference surfaces extending in y-direction, all said reference surfaces being located at a predetermined location with respect to the guiding channels, wherein the second guiding plate is mounted moveably in x-, y- and z-directions in a housing and wherein means are provided for exerting forces for pressing the cooperating reference surfaces and the contact pads towards each other in the x-, y- and z-directions during coupling the connector parts, wherein one connector part can be inserted into the other in the longitudinal direction of the guiding channels, and wherein distance elements are provided, said distance elements being adapted to keep the contact pads of the conductors at a distance from each other in z-direction during inserting of the connector part and to enable the movement of the contact pads towards each other in z-direction as soon as the cooperating reference surfaces are substantially abutting.

In this manner a connector assembly is obtained wherein the contact pads of the conductors do not contact each other during coupling the connector parts so that the contact pads cannot be damaged.

In order to obtain a simple construction said means for exerting a force comprise a surface formed on the second guiding plate, said surface enclosing an angle of preferably 45° with the x-, y- and z-direction, wherein a spring means is provided for exerting a force into one of these directions on said surface.

BRIEF DESCRIPTION OF THE DRAWINGS

The invention will be further explained by reference to the drawings in which two embodiments of the connector assembly of the invention are schematically shown.

FIG. 2 is a perspective exploded view of the second connector part.

FIG. 3 is a section according to the plane III—III of FIG. 2.

DETAILED DESCRIPTION OF A PREFERRED EMBODIMENT

Figure 1:
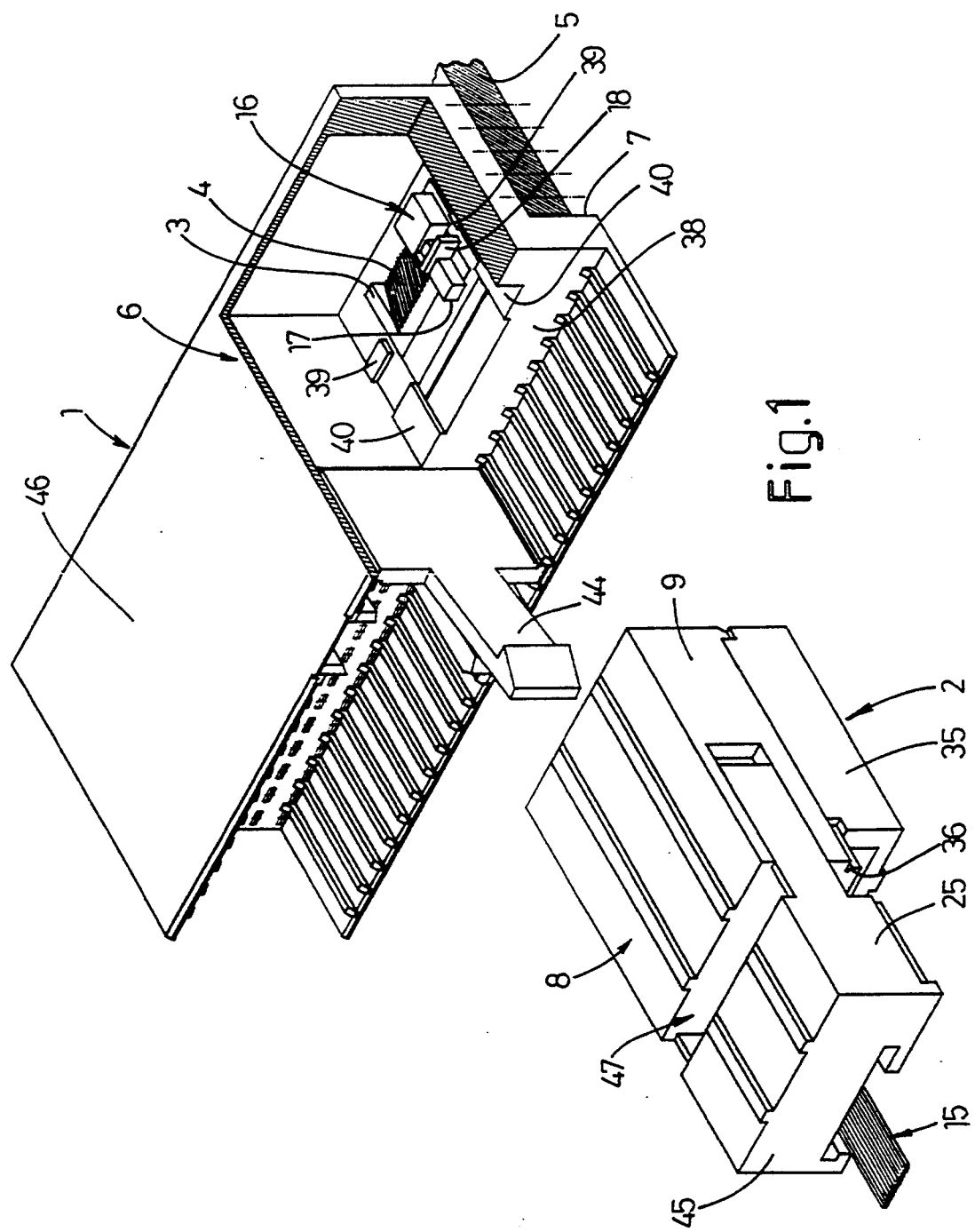
FIG. 1 shows a perspective view of a first embodiment of the connector assembly according to the invention wherein the connector parts are disconnected and the first connector part is shown partially cut-away.

Referring to the drawings there is shown a connector assembly for interconnecting optical and/or electrical conductors, which connector assembly comprises a first connector part 1 and a second connector part 2. The first connector part 1 comprises a first guiding plate 3 with a plurality of adjacent guiding channels 4 for first conductors which are not shown for the sake of clarity. These first conductors are embedded in a printed circuit board 5 in which the first guiding plate 3 is also embedded. Each of the conductors is located in a guiding channel 4 so that the position of the conductors is determined by the guiding channels 4. These guiding channels 4 incline gradually to the main surface of the guiding plate 3 so that the ends of the conductors are guided towards this main surface. In the embodiment shown the main surface of the guiding plate 3 coincides with the main surface of the printed circuit board 5. If desired the guiding plate 3 can also be embedded with its main surface countersunk in the printed circuit board 5. The parts of the conductors projecting out of the printed circuit board 5 are polished in such a manner that contact pads of the conductors in the surface of the printed circuit board 5 are obtained.

The connector part 1 is further provided with a housing 6 which is attached to an end of the printed circuit board 5 in a manner as shown in FIG. 1 and is thereby enclosing the guiding plate 3 with the contact pads of the conductors. A shoulder 7 of the housing 6 abuts the end edge of the printed circuit board 5.

The second connector part 2 comprises a housing 8 and is shown in FIG. 2 in an exploded view. The housing 8 comprises a support part 9 in which a support plate 10 with a guiding plate 11 is mounted moveable in three mutually perpendicular directions x, y and z. The x-, y- and z-directions are indicated by arrows in FIG. 2. To this end guiding slots 12 are formed in the support part 9, into which the support plate 10 projects with guiding edges 13 with sufficient play for the required freedom of movement. The support plate 10 with the guiding plate 11 is shown from two opposite sides at a larger scale in FIGS. 4 and 5.

Figure 4:
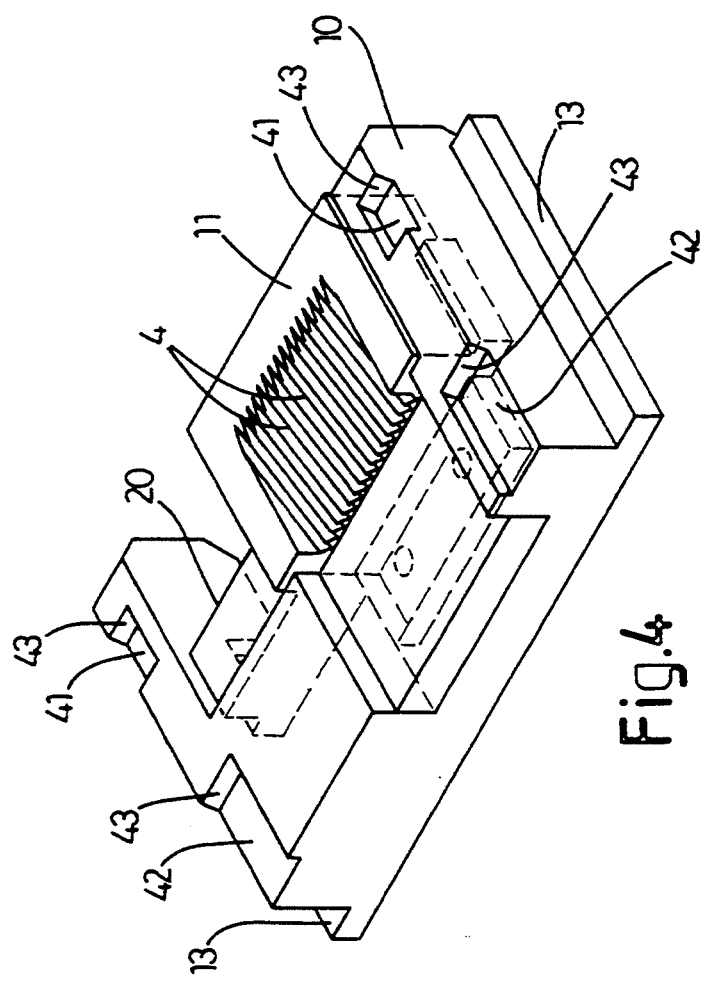
FIGS. 4 and 5 show the opposite sides of a portion of the connector part of FIG. 2 at a larger scale.
Figure 5:
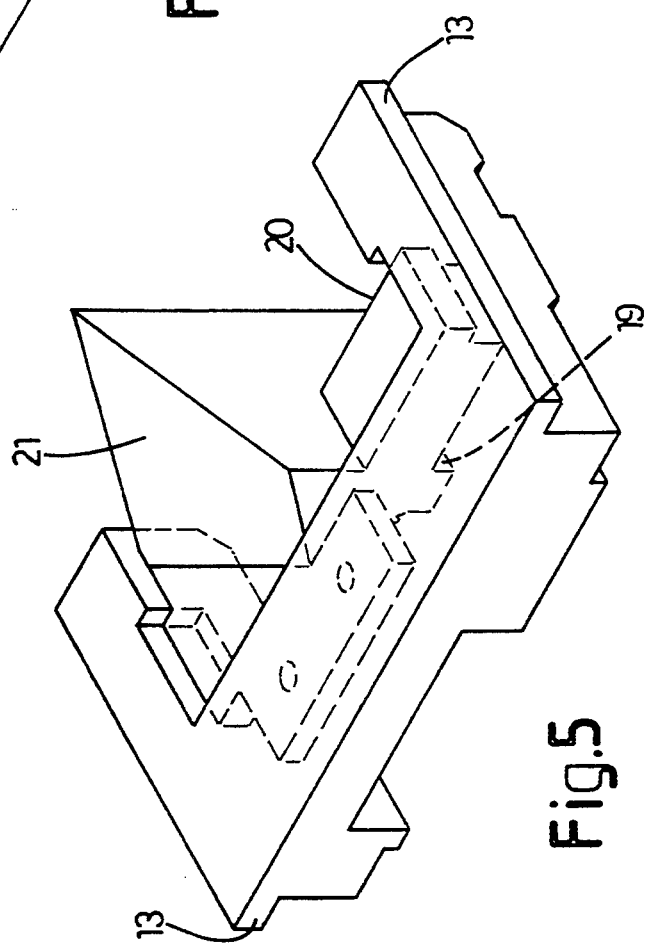

The guiding plate 11 is provided with guiding channels 4 in the same manner as the guiding plate 3, for optical and/or electrical conductors 14 of a flat cable 15 schematically shown in FIG. 2. The conductors 14 in the guiding channels 4 are guided gradually to the main surface of the guiding plate 11, wherein the parts projecting above the main surface of the guiding plate 11 are polished in such a manner that contact pads in the main surface of the guiding plate 11 are obtained. The main surface of the guiding plate 11 is lying slightly above the surface of the support plate 10 as can be seen in FIG. 4.

For coupling the connector parts 1 and 2 with each other, the connector part 2 is inserted into the housing 6 of the connector part 1, wherein the guiding plate 11 can be brought into the correct position with respect to the guiding plate 3 due to the freedom of moveability in the x-, y- and z-directions in such a manner that the contact pads of the corresponding conductors join each other. For mutually positioning the guiding plates 3, 11, these guiding plates are provided with positioning means made as straight reference surfaces extending in the x- and y-directions. For a further explanation of these positioning means reference is made to the above-mentioned patent application Ser. No. 08/063,447.

The guiding plate 3 of the connector part 1 has a lug 16 made in one piece and having straight reference surfaces 17 and 18 located at accurately determined locations in y- and x-directions, respectively, with respect to the guiding channels 4 and therefore with respect to the contact pads of the corresponding conductors. The guiding plate 11 of the connector part 2 is provided with reference surfaces 19 and 20 being located at accurately determined locations in y- and x-directions, respectively, with respect to the guiding channels 4 of the guiding plate 11. By pressing the guiding surfaces 17, 19 and 18, 20, respectively, against each other during coupling the connector parts 1 and 2, the guiding plate 11 with the contact pads of the corresponding conductors 14 is accurately positioned with respect to the guiding plate 3 with the contact pads of the corresponding conductors not shown.

In the connector assembly shown the connector part 2 is provided with means for exerting forces pressing the cooperating reference surfaces 17, 19 and 18, 20 towards each other in the x- and y-directions and also pressing the contact pads, i.e. the guiding plates 3 and 11 in z-direction towards each other. These means comprise a surface 21 formed on the guiding plate 11 and preferably enclosing an angle of 45° with the x-, y- and z-directions as in the embodiment shown. The surface 21 is preferably smoothly polished. A pin 22 is mounted slidably in y-direction in the support part 9 of the housing 8. This pin 22 has a head 23 accommodated in a chamber 24 of a closure part 25 of the housing 8. This closure part 25 engages with hooks 26 into recesses 27 which are formed in the side walls of the support part 9. A spring 28 is mounted in the chamber 24 and engages the head 23 of the pin 22. A smooth rounded end 29 of the pin 22 engages the oblique surface 21. Thereby the force exerted by the spring 28 on the pin 22 is distributed by the surface 21 in x-, y- and z-directions.

As shown in FIG. 2, a strain relieve element 30 is mounted in the closure part 25, said strain relieve element projecting with an edge in a slot 32 of the closure part 25 and being provided at its other end with two locking lugs 33, only one of which is shown in FIG. 2. These locking lugs 33 engage under tongues 34 of the closure part 25. Thereby the strain relieve element 30 clamps the cable 15 in the closure part 25.

The housing 8 is further provided with a protective cover 35 slidably mounted on the support part 9 and the closure part 25. To this end the support part 9 and the closure part 25 are provided with guidings 36, wherein the cap 35 is engaging into these guidings 36 by means of corresponding guidings 37. The protective cap 35 is slidable between a protection position in which the contacts pads of the corresponding conductors 14 are covered and an access position not shown, in which the contact pads are freely accessible. The protective cap 35 is moved from the protection position into the access position during coupling the connector parts 1 and 2 in that the protective cap 35 abuts a wall 38 of the housing 6 operating as a stop.

The housing 6 of the connector part 1 comprises distance elements 39 and 40 on both sides of the guiding channels 4 of the guiding plate 3. These distance elements 39, 40 consist of bosses lying one behind the other in the longitudinal direction of the guiding channels 4 and projecting above the surface of the contact pads and the main surface of the guiding plate 3, respectively, along a distance larger than the distance along which the guiding plate 11 projects above the support plate 10. The support plate 10 of the guiding plate 11 is provided with recesses 41 and 42 also lying on both sides of the guiding channels 4 of the guiding plate 11 and being complementary to the bosses 39 and 40, respectively. At the insertion side of the connector part 2 the recesses 41 and 42 join the main surface of the support plate 10 through an oblique surface 43. The shape of the bosses 39, 40 and the recesses 41, 42, respectively, is such that the recesses 41 adjacent to the insertion side do pass the bosses 40 adjacent to the insertion side. In this manner it is obtained that the contact pads of the conductors will be maintained at a distance from each other in z-direction during inserting the connector part 2 into the connector part 1. When the cooperating reference surfaces 17, 19 and 18, 20, respectively, are substantially opposite of each other the possibility of movement in z-direction of the guiding plate 11 is enabled in that the bosses 39, 40 are received in the recesses 41, 42, wherein the oblique surfaces 43 provide for a gradual transition. Thereby, it is avoided in an efficient manner that the contact pads are damaged by sliding of the contact pads on each other.

The connector part 1 is provided with locking hooks 44, only one of which is shown in FIG. 1 which lock on the backside 45 of the housing 8. In the embodiment shown the connector part 1 further comprises a housing half 46 which is made as a conventional electrical connector part and is provided with contact pins (not shown) in a usual manner.

In the embodiment of the connector part 2 as shown the hooks 26 of the closure part 25 project into recesses 27 which provide for some freedom of movement in y-direction for the closure part 25 with respect to the support part 9. Thereby an intermediate space 47 is present between the closure part 25 and the support part 9. However, it is also possible that the closure part 25 joins the support part 9 without intermediate space 47 by means of a suitable design of the recesses 27.

Figure 6:
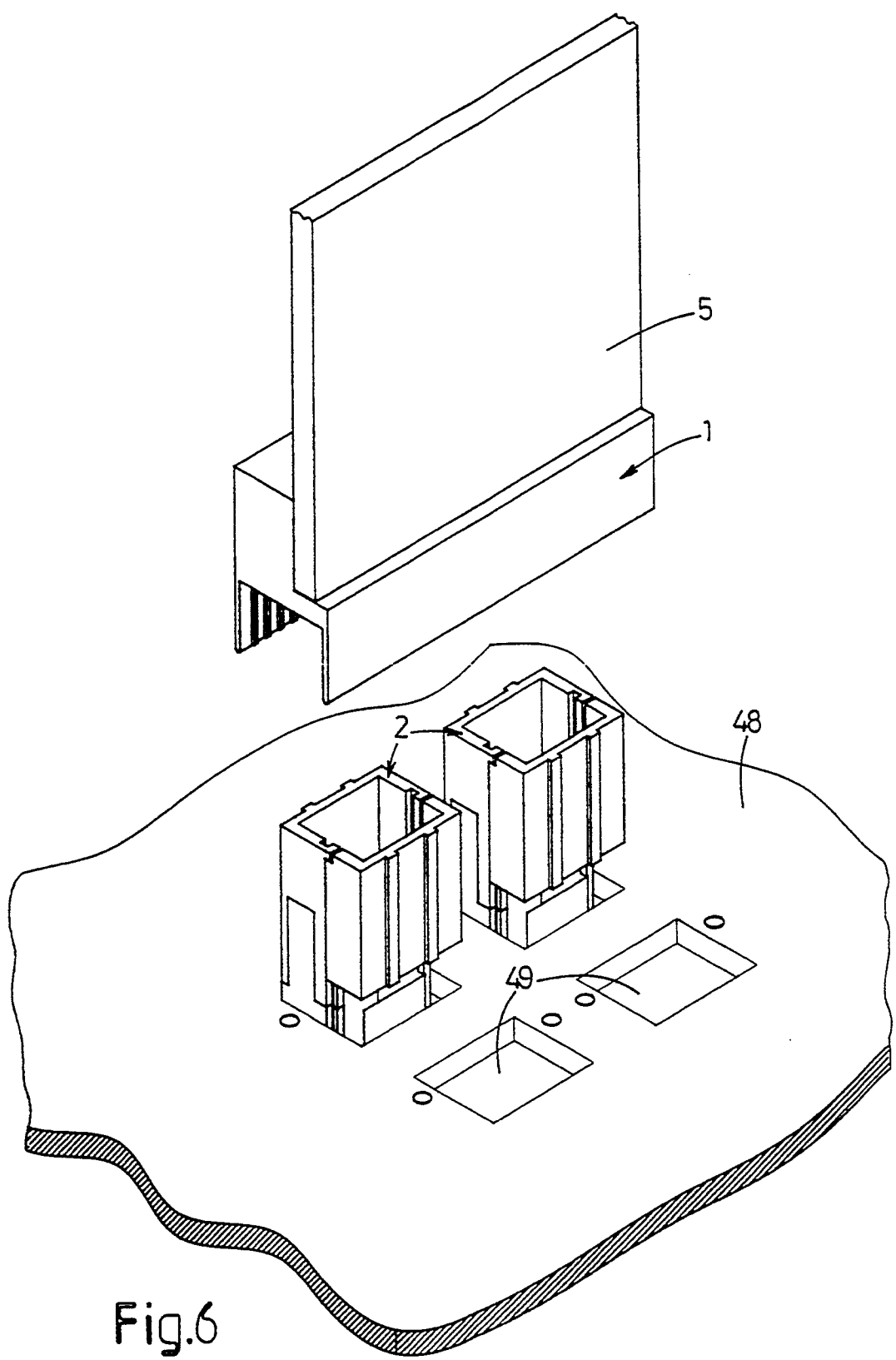
FIG. 6 schematically shows a perspective view of a second embodiment of the connector assembly according to the invention.

FIG. 6 shows an embodiment of the connector assembly described, wherein the closure part 25 joins the support part 9 without such an intermediate space 47. In this embodiment two connector parts 2 cooperate with one connector part 1. In this case the connector parts 2 are mounted in a suitable manner in a backpanel 48 or a frame, at the backside of which optical and/or electrical conductors (not shown) are guided. As schematically indicated by the recesses 49 a plurality of rows of connector parts 2 can be mounted next to each other on the backpanel 48. For the remaining part the connector parts 2 fully correspond with the above-described connector part 2.

The invention is not restricted to the above-described embodiments which can be varied in a number of ways within the scope of the claims.

We claim:

1. Connector assembly for interconnecting optical and/or electrical conductors, comprising a first connector part with a first guiding plate with one or more guiding channels for first conductors each terminated by a contact pad and a second connector part to be coupled with the first connector part and having a second guiding plate with one or more guiding channels provided in a corresponding manner for second conductors to be connected with the first conductors and each terminated by a contact pad, wherein the guiding plates comprise positioning means for mutually positioning the guiding plates in the coupled position of the connector parts in such a manner that corresponding contact pads of the first and second conductors are interconnected optically and electrically, respectively, said positioning means comprising cooperating straight reference surfaces extending in x-direction and cooperating straight reference surfaces extending in y-direction, all said reference surfaces being located at a predetermined location with respect to the guiding channels, wherein the second guiding plate is mounted moveably in x-, y- and z-directions in a housing and wherein means are provided for exerting forces for pressing the cooperating reference surfaces and the contact pads towards each other in the x-, y- and z-directions during coupling the connector parts, wherein one connector part can be inserted into the other in the longitudinal direction of the guiding channels, and wherein distance elements are provided, said distance elements being adapted to keep the contact pads of the conductors at a distance from each other in z-direction during inserting of the connector part and to enable the movement of the contact pads towards each other in z-direction as soon as the cooperating reference surfaces are substantially abutting.

2. Connector assembly according to claim 1, wherein the distance elements of said one connector part comprise at least a set of two bosses consecutive in the longitudinal direction of the guiding channels and projecting above the surface of the contact pads of the corresponding connector part, wherein the other connector part comprises at least one set of two recesses complementary to the respective bosses and recessed with respect to the surface of the contact pads.

3. Connector assembly according to claim 2, wherein a set of two bosses and recesses, respectively, is provided on both sides of the guiding channels.

4. Connector assembly according to claim 2, wherein the boss (bosses) adjacent to the insertion side has a shape which does not match with the recess (recesses) adjacent to the insertion side.

5. Connector assembly according to claim 2, wherein the recesses join at the insertion side the surface of the contact pads through an oblique surface.

6. Connector assembly according to claim 1, wherein said means for exerting a force comprise a surface formed on the second guiding plate, said surface enclosing an angle of preferably 45° with the x-, y- and z-direction, wherein a spring means is provided for exerting a force into one of these directions on said surface.

7. Connector assembly according to claim 6, wherein a pin is slidably mounted in the housing preferably into the y-direction, said pin engaging with one end the oblique surface of the second guiding plate and being loaded at its other end by a spring.

8. Connector assembly according to claim 7, wherein said one end of the pin is smooth and rounded and that the oblique surface of the guiding plate is preferably also made smoothly.

9. Connector assembly according to claim 1, wherein the housing of the second connector part comprises a protective cap slidable between a protection position in which the contact pads of the corresponding conductors are covered, and an access position in which the contact pads are freely accessible.

10. Connector assembly according to claim 9, wherein the first connector part also comprises a housing provided with a stop for the protective cap of the housing of the second connector part, wherein said stop moves the protective cap from the protection position into the access position during inserting the second connector part.

11. Connector assembly according to claim 10, wherein the housing of the first connector part is adapted to be mounted on the end edge of a printed circuit board and that the housing of the second connector part is adapted to receive a flat optical/electrical cable.

12. Connector assembly according to claim 11, wherein the housing of the second connector part is adapted to be mounted on a backpanel or a frame.

* * * * *